(12) United States Patent
Aher et al.

(10) Patent No.: US 12,118,978 B2
(45) Date of Patent: Oct. 15, 2024

(54) SYSTEMS AND METHODS FOR GENERATING SYNTHESIZED SPEECH RESPONSES TO VOICE INPUTS INDICATIVE OF A USER IN A HURRY

(71) Applicant: ROVI GUIDES, INC., San Jose, CA (US)

(72) Inventors: Ankur Aher, Maharashtra (IN); Jeffry Copps Robert Jose, Tamil Nadu (IN)

(73) Assignee: Rovi Guides, Inc., San Jose, CA (US)

(*) Notice: Subject to any disclaimer, the term of this patent is extended or adjusted under 35 U.S.C. 154(b) by 0 days.

(21) Appl. No.: 18/387,211

(22) Filed: Nov. 6, 2023

(65) Prior Publication Data
US 2024/0153483 A1    May 9, 2024

Related U.S. Application Data

(63) Continuation of application No. 17/882,289, filed on Aug. 5, 2022, now Pat. No. 11,842,721, which is a
(Continued)

(30) Foreign Application Priority Data

Apr. 9, 2020    (IN) .............................. 202041015653

(51) Int. Cl.
G10L 13/06       (2013.01)
G10L 13/00       (2006.01)
(Continued)

(52) U.S. Cl.
CPC .......... G10L 13/0335 (2013.01); G10L 25/63 (2013.01); *G10L 13/00* (2013.01);
(Continued)

(58) Field of Classification Search
CPC ......... G10L 13/06; G10L 13/00; G10L 13/08; G10L 15/00; G10L 15/22; G10L 15/16;
(Continued)

(56) References Cited

U.S. PATENT DOCUMENTS 11,443,731 B2    9/2022    Aher et al.
11,450,306 B2    9/2022    Aher et al.
(Continued)

FOREIGN PATENT DOCUMENTS

JP    2001272991 A    * 10/2001    ............. G10L 13/06
KR    20210020656 A   * 2/2021     ............. G10L 15/16

*Primary Examiner* — Farzad Kazeminezhad
(74) *Attorney, Agent, or Firm* — Haley Guiliano LLP

(57) ABSTRACT

The system provides a synthesized speech response to a voice input, based on the prosodic character of the voice input. The system receives the voice input and calculates at least one prosodic metric of the voice input. The at least one prosodic metric can be associated with a word, phrase, grouping thereof, or the entire voice input. The system also determines a response to the voice input, which may include the sequence of words that form the response. The system generates the synthesized speech response, by determining prosodic characteristics based on the response, and on the prosodic character of the voice input. The system outputs the synthesized speech response, which includes a more natural, relevant, or both answer to the call of the voice input. The prosodic character of the voice input and/or response may include pitch, note, duration, prominence, timbre, rate, and rhythm, for example.

16 Claims, 7 Drawing Sheets

Related U.S. Application Data continuation of application No. 15/931,074, filed on May 13, 2020, now Pat. No. 11,443,731.

(51) Int. Cl.

| | | |
|---|---|---|
| *G10L 13/02* | (2013.01) | |
| *G10L 13/033* | (2013.01) | |
| *G10L 13/08* | (2013.01) | |
| *G10L 15/00* | (2013.01) | |
| *G10L 15/10* | (2006.01) | |
| *G10L 15/16* | (2006.01) | |
| *G10L 15/18* | (2013.01) | |
| *G10L 15/22* | (2006.01) | |
| *G10L 15/26* | (2006.01) | |
| *G10L 25/63* | (2013.01) | |

(52) U.S. Cl.
CPC .............. *G10L 13/02* (2013.01); *G10L 13/06* (2013.01); *G10L 13/08* (2013.01); *G10L 15/00* (2013.01); *G10L 15/10* (2013.01); *G10L 15/16* (2013.01); *G10L 15/18* (2013.01); *G10L 15/22* (2013.01); *G10L 15/26* (2013.01)

(58) Field of Classification Search
CPC ......... G10L 13/02; G10L 15/10; G10L 15/18; G10L 15/26
See application file for complete search history.

(56) References Cited

U.S. PATENT DOCUMENTS

| | | |
|---|---|---|
| 11,842,721 B2 | 12/2023 | Aher et al. |
| 2003/0055653 A1 | 3/2003 | Ishii et al. |
| 2015/0186359 A1 | 7/2015 | Fructuoso et al. |
| 2020/0135197 A1 | 4/2020 | Nakanishi et al. |
| 2020/0384372 A1 | 12/2020 | Candelore et al. |
| 2021/0319779 A1 | 10/2021 | Aher et al. |
| 2021/0319780 A1 | 10/2021 | Aher et al. |
| 2023/0140273 A1 | 5/2023 | Aher et al. |

\* cited by examiner

SYSTEMS AND METHODS FOR GENERATING SYNTHESIZED SPEECH RESPONSES TO VOICE INPUTS INDICATIVE OF A USER IN A HURRY

CROSS-REFERENCE TO RELATED APPLICATIONS

This is a continuation application of U.S. patent application Ser. No. 17/882,289, filed Aug. 5, 2022, which is a continuation of U.S. patent application Ser. No. 15/931,074, filed May 13, 2020, now U.S. Pat. No. 11,443,731, which claims priority to Indian Patent Application No. 202041015653, filed Apr. 9, 2020, the disclosures of the which are hereby incorporated by reference herein in their entireties.

BACKGROUND

The present disclosure relates to systems for managing responses to voice inputs, and, more particularly, systems for generating more natural speech responses to voice inputs based on prosody.

SUMMARY

Voice-based assistants can play a crucial role in serving a wide variety of user requests. For example, some voice assistants' knowledge base is continually being updated with new use cases, ranging from setting alarms to booking tickets for holiday vacations. Systems take as input questions or commands from the user, and provide answers or perform functions in response. One challenge that arises is in the naturalness of the responses that voice assistants generate when communicating with the user. For example, historically, responses lacked prosodic variations when a phrase or word was uttered back to the user, causing the response to sound synthetic and unnatural. Increasing the naturalness of the response is more likely to engage the user and encourage the user to interact further with the system.

The present disclosure describes systems and methods for providing a synthesized speech response to a voice input in the context of prosodic information. A voice input includes one or more words. The system determines prosodic characteristics of the voice input, or words or phonemes thereof, to inform the type and character of a response; prosodic characteristics of a response to a voice input based on the voice input; or a combination thereof. The system determines a response to the voice input, and then generates the synthesized speech response to the voice input for output. The synthesized speech response includes prosodic characteristics that the system determines based on the response itself and the prosodic character of the voice input. The prosodic character of a voice input or response includes pitch, note, duration, prominence, timbre, rate, rhythm, any other suitable metric, and any combination thereof that affect the sound of the utterance. The voice input may include a query, a command, any other suitable voice stimulus, or any combination thereof.

In an embodiment, the system generates the synthesized speech response by determining predicted prosodic characteristics of the response using a model (e.g., an algorithmic model, a neural network model, or any other suitable model). In some such embodiments, the system modifies the predicted prosodic characteristics to generate the prosodic characteristics of the synthesized speech response. For example, the prediction may include a default synthesized speech response, which is made to sound more natural or otherwise match the prosody of the voice input by applying the determined prosodic characteristics to the response. To illustrate, the default synthesized speech response may lack prosody indicative of emotion, sentiment, or context, and the system's modification of the response's prosody may provide an improvement. In an embodiment, the system interpolates, normalizes, or otherwise modifies the prosodic character of the response to improve prosody. For example, in an embodiment, the system uses an interpolation operation to affect transitions between words or sounds in the synthesized speech response.

In an embodiment, a plurality of reference responses are associated with the voice input, and the prosodic characteristics of the synthesized speech response are based on a relationship between the prosodic metric(s) of the voice input and the plurality of reference responses. For example, each reference response may be associated with a prosody of the voice input. To illustrate, a shorter response may correspond to a hasty voice input (e.g., having a faster rate), or a more musical response (e.g., having more pitch variation) may be used to match musicality of a voice input. In a further example, in an embodiment, the system identifies which of the plurality of reference responses include respective reference prosodic characteristics that are most closely related to the at least one prosodic metric. In some such embodiments, the prosodic characteristics of the synthesized speech response are further based on the identified reference response. In a further example, in an embodiment, the system identifies which of the plurality of reference responses is most closely related to the at least one prosodic metric.

In an embodiment, the system uses user profile information such as, for example, user voice input history, user language, user characteristics, user location, user preferences, metadata tags associated with the user, any other suitable user information, or any combination thereof to determine the prosodic characteristics of the response.

In an embodiment, the system determines an emotion metric based on the voice input, and determines prosodic characteristics of the response based on the emotion metric. For example, the system may determine that the prosodic metrics associated with words of a voice input correspond to a particular emotion such as anger. Accordingly, the system may determine the prosodic characteristics of the response based on the emotion (e.g., matching or counteracting the emotion).

The present disclosure also describes systems and methods for training a model to provide a synthesized speech response to a voice input in the context of prosodic information. For example, the system may train a model based on a training set of data, and then apply the model to voice inputs to generate responses having desired prosody. The system receives a plurality of voice inputs, each associated with at least one respective voice input prosodic metric, and a plurality of responses, each associated with at least one respective response prosodic metric. The plurality of voice inputs and the plurality of responses are associated in a database, and the system may retrieve the voice inputs and responses from the database. To illustrate, in an embodiment, each voice input of the plurality of voice inputs is linked with a respective set of responses of the plurality of responses. The system trains the model based on the plurality of voice inputs, the plurality of responses, the voice input prosodic metrics, and the response prosodic metrics such that the model outputs information used to generate the synthesized speech response to the voice input. For example, the voice input and response prosodic metrics each include pitch, note, duration, prominence, timbre, rate, rhythm, any other suitable metrics, or any combination thereof.

In an embodiment, each voice input includes a plurality of words and each response includes a plurality of words. In some such embodiments, the system determines as input word transition metrics among words of the voice input and word transition metrics among words of the response. For example, the system trains the model based on the word transitions of the voice input and response. In an embodiment, the system receives at least one voice input prosodic metric associated with one or more words of each voice input and at least one answer prosodic metric associated with one or more words of each response.

In an embodiment, the system receives an emotion metric for each voice input and response, and trains the model further based on the emotion metrics of the voice input and response. In an embodiment, the system uses user profile information as input and trains the model further based on the user profile information. For example, user profile information includes user voice input history, user language, user characteristics, user location, user preferences, metadata tags associated with the user, any other suitable user information, or any combination thereof. In an embodiment, the system receives interpolation metrics among transition of words of each voice input of the plurality of voice inputs, and trains the model further based on each interpolation metric. For example, in an embodiment, the system determines that prosodic metrics of adjacent words or sounds require smoothing or otherwise transitioning, and applies a modification to the response to generate the desired prosody.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure is directed to improving naturalness of synthesized speech responses by introducing analysis to more closely emulate how a human being would speak. For example, improving naturalness is applicable to voice-based chat services and personal voice assistants such as, for example, Alexa (Amazon), Cortana (Microsoft), and Siri (Apple).

Figure 1:
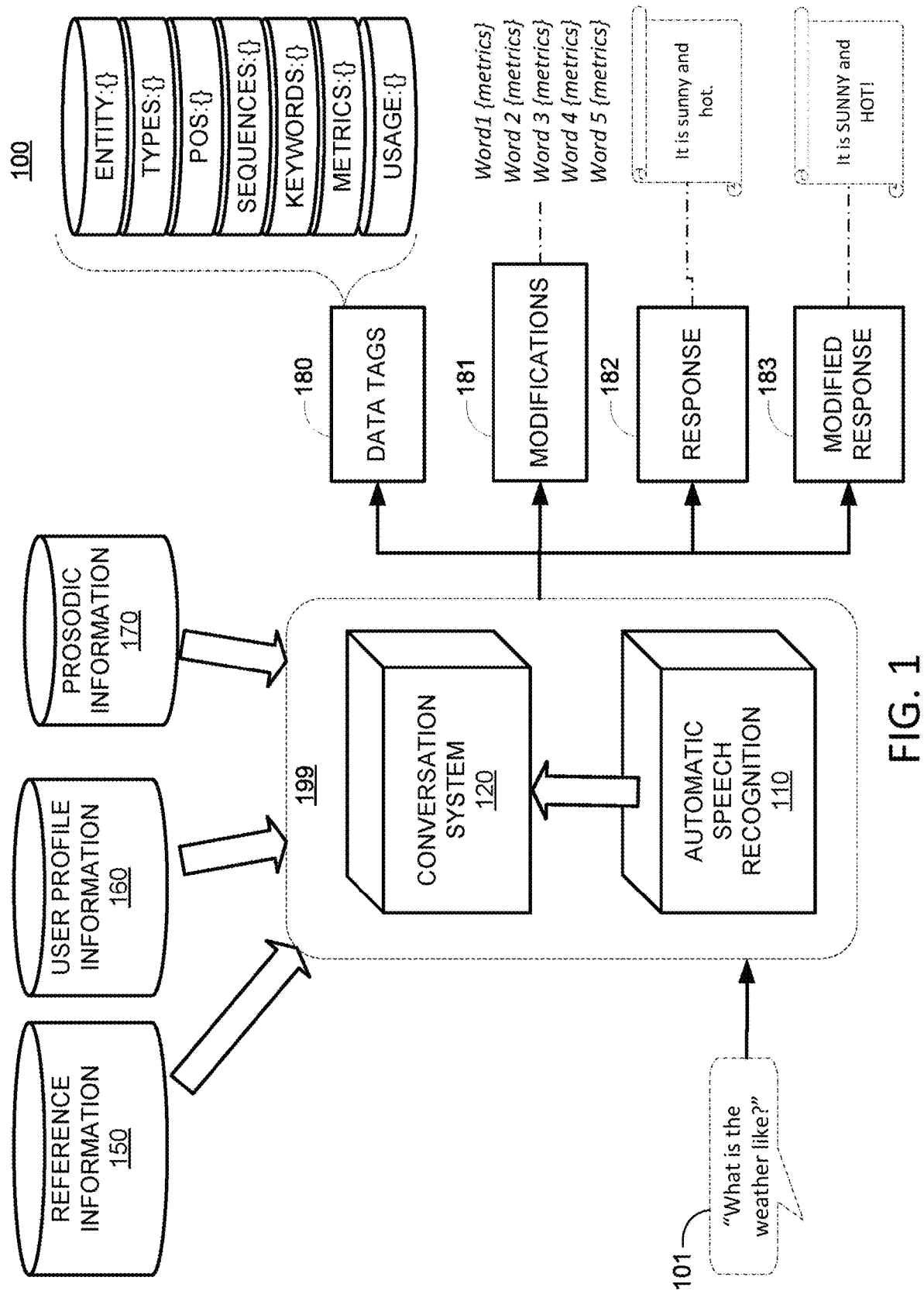
FIG. 1 shows a block diagram of an illustrative system for responding to a voice input, in accordance with an embodiment of the present disclosure.

FIG. 1 shows a block diagram of illustrative system 100 for responding to a voice input, in accordance with an embodiment of the present disclosure. System 100 includes ASR module 110, conversation system 120, reference information 150, user profile information 160, and prosodic information 170. For example, ASR module 110 and conversation system 120, which together may be included in system 199, may be used to implement a voice application. In an embodiment, system 199 may communicate with, or otherwise interact with, a search system (e.g., by transmitting a text query and receiving a text response). For example, conversation system 120 may include natural language understanding (NLU) analytics to identify and parse text.

A user may assert voice input 101 which includes speech "What is the weather like" to an audio interface of system 199. Voice input 101 may include a query or question, a statement, a command, or other voice stimulus. ASR module 110 is configured to sample, condition, and digitize the received audio input and analyze the resulting audio file to generate a text input. In an embodiment, ASR module 110 retrieves information from user profile information 160 to help generate the text input. For example, voice recognition information for the user may be stored in user profile information 160, and ASR module 110 may use voice recognition information to identify the speaking user. In an embodiment, conversation system 120 is configured to generate a text input, respond to the text input, or both, based on the recognized words from ASR module 110, contextual information, user profile information 160, reference information 150, prosodic information 170, any other information, or any combination thereof. For example, conversation system 120 may generate a text input and then compare the text input with metadata associated with a plurality of entities to determine a match (e.g., to identify entities and thus context of voice input 101). In a further example, conversation system 120 may compare one or more recognized words, parts of speech, articles, or other aspects of the text input to reference information 150 to determine a response. In an embodiment, conversation system 120 generates a string of text from the voice input, and analyzes the string of text to generate a text input. In a further example, reference information 150 may include one or more reference templates with which the text input may be compared to identify types, format, or otherwise help in generating a text input. System 199 may generate, modify, or otherwise manage data tags 180 based on analyzing the text. Data tags 180 may include any suitable type of tags associated with an entity, type, part of speech or sequence thereof, keyword or sequence thereof, sequence or pattern of features, or any other feature of the voice input (e.g., voice input 101). In an embodiment, each tag is associated with a word or phrase of voice input 101. System 199 may identify and output text to a search engine, display device, memory storage, or other suitable output for further processing, storage, response, or a combination thereof. System 199 may identify and retrieve response 182, based on a search operation (e.g., of reference information 150). For example, system 199 may retrieve a music or video playlist, a video for display, a music item for display, any other suitable content item, requested information, or any combination thereof.

In an embodiment, system 199 uses machine learning including Convolutional Neural Networks or Recurrent Neural Network or Long Short-Term Memory (LSTM). For example, the list of features used for training may cover basic prosodic features that affect the sound of a voice input or a response. The input and outputs of the model may be multi-labelled to generate a predicted pitch and prosody that will engage the user. System 199 allows for an increase in the naturalness of responses generated by conversation system 120; an increase in the user engagement with conversation system 120 (e.g., of a voice-enabled device); the user needing to focus less attention on reacting to an unnatural sounding response (e.g., the more natural synthesized speech response will sound more like a friend or a neighbor talking rather than a machine); or a combination thereof.

User profile information 160 may include user identification information (e.g., name, an identifier, address, contact information), user voice input history (e.g., previous voice queries, previous text queries, previous voice commands, previous search results, feedback on previous search results or queries), user preferences (e.g., search settings, favorite entities, keywords included in more than one voice input), user likes/dislikes (e.g., entities followed by a user in a social media application, user-inputted information), other users connected to the user (e.g., friends, family members, contacts in a social networking application, contacts stored in a user device), user voice data (e.g., audio samples, signatures, speech patterns, or files for identifying the user's voice or prosodic character), any other suitable information about a user, or any combination thereof.

Prosodic information 170 includes any suitable information for analyzing a voice input, generating a synthesized speech response, identifying a user, estimating an emotional state of a user, or a combination thereof. Reference information 150, user profile information 160, and prosodic information 170 may be included in one or more databases, collectively or separately. For example, prosodic information 170 may be included as part of reference information 150, and need not be separate as illustrated. In an embodiment, prosodic information 170 includes statistical information for a plurality of users (e.g., audio characteristics for a plurality of users and a plurality of words or phonemes), a plurality of entities (e.g., content associated with entities, metadata, static types), or a combination thereof. For example, prosodic information 170 may include audio information about a plurality of entities including persons, places, objects, events, content items, media content associated with one or more entities, or any combination thereof.

System 199 may be configured to provide one or more outputs. For example, system 199 may be configured to generate or modify data tags 180, generate or apply modifications 181, generate response 182, generate modified response 183, provide any other suitable output, or any combination thereof. Data tags 180 may be stored as metadata, or any other suitable format, and may include, for example, entity identifiers, types, parts of speech (e.g., of a voice input, a response, or both), word or phrase sequence (e.g., of a voice input, a response, or both), keywords (e.g., of a voice input, a response, or both), metrics (e.g., determined for a voice input, a response, or both), usage information (e.g., number, type, and details of voice input, response, or both). In an embodiment, system 199 determines response 182 to voice input 101. Response 182 may have associated prosodic characteristics that govern pronunciation of response 182 by a text-to-speech engine of conversation system 120. System 199 may determine one or more modifications 181, which, when applied to response 182, generate modified response 183. Modification 181 include prosodic adjustments, prosodic settings, text modifications, or a combination thereof. In an illustrative example, system 199 may determine modifications 181 based on the text of voice input 101, the prosodic character of voice input 101, or both.

Figure 2:
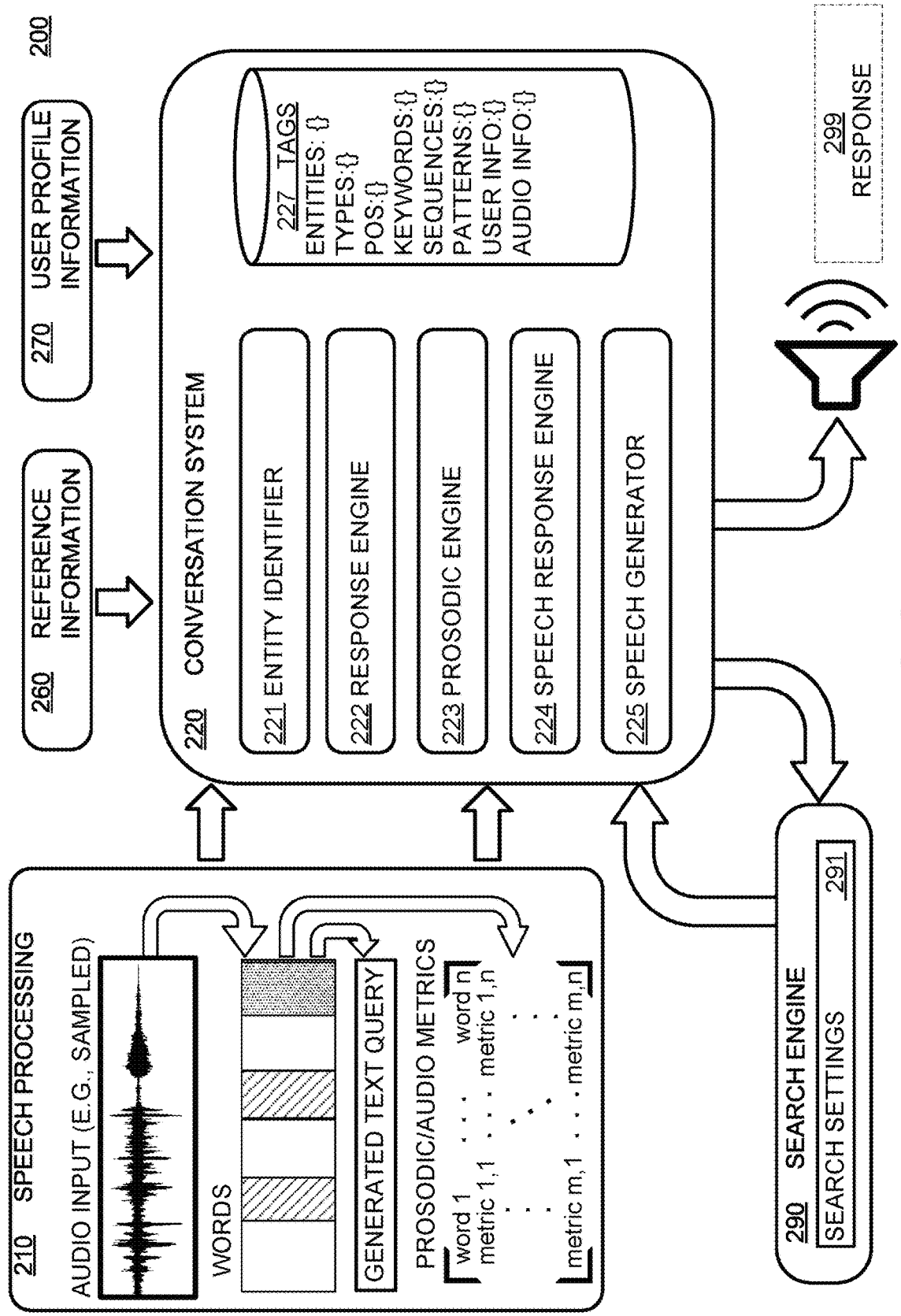
FIG. 2 shows a block diagram of an illustrative system for generating a response to a voice input based on prosodic metrics, in accordance with an embodiment of the present disclosure.

FIG. 2 shows a block diagram of illustrative system 200 for generating a response to a voice input based on prosodic metrics, in accordance with an embodiment of the present disclosure. As illustrated, system 200 includes speech processing system 210, conversation system 220, search engine 290, user profile information 270, and reference information 260. For example, a user may fire a voice input at speech processing system 210, which provides a string of text to conversation system 220. Conversation system 220 identifies one or more entities in the string of text (e.g., using entity identifier 221), identifies one or more types of the string of text, interprets the string of text as a query, interprets the string of text as a command, identifies any other suitable aspect of the string of text, or a combination thereof. Conversation system 220 may also retrieve data from reference information 260, user profile information 270, and search engine 290.

Speech processing system 210 may identify an audio file and may analyze the audio file for phonemes, patterns, words, or other elements from which keywords may be identified. In an embodiment, speech processing system 210 may analyze an audio input in the time domain, spectral domain, or both to identify words. For example, speech processing system 210 may analyze the audio input in the time domain to determine periods of time during which speech occurs (e.g., to eliminate pauses or periods of silence). Speech processing system 210 may then analyze each period of time in the spectral domain to identify phonemes, patterns, words, or other elements from which prosodic metrics and keywords may be identified. Speech processing system 210 may output text, one or more words, or a combination thereof. In an embodiment, speech processing system 210 may retrieve data from user profile information 270 for voice recognition, speech recognition, or both. Speech processing system 210 identifies one or more prosodic metrics for the voice input, words thereof, or both, by analyzing the audio signal.

Conversation system 220 receives the output from speech processing system 210 and generates a text input (e.g., to provide to search engine 290). As illustrated, conversation system 220 includes entity identifier 221, response engine 222, prosodic engine 223, speech response engine 224, and speech generator 225. In an embodiment, conversation system 220 may include search engine 290. Search engine 290 may use user profile information 270 to generate, modify, or interpret a text input or string of text. Reference information 260 may include a data graph and metadata associated with a plurality of entities, content associated with the plurality of entities, or both. For example, data may include an identifier for an entity, details describing an entity, a title referring to the entity, phrases associated with the entity, links (e.g., IP addresses, URLs, hardware addresses) associated with the entity, keywords associated with the entity (e.g., tags or other keywords), prosodic information associated with one or more words or phrases, any other suitable information, or any combination thereof. In an embodiment, conversation system 220 generates tags 227 or other suitable metadata for storage. For example, as conversation system 220 responds to increasing numbers of voice inputs, the set of information may be used to inform further voice input responses (e.g., using machine learning, data analysis techniques, statistics).

Entity identifier 221 of conversation system 220 identifies one or more entities of the text input. In an embodiment, entity identifier 221 compares words of the voice input against tags associated with nodes of the information graph to identify one or more entities. In an embodiment, conversation system 220 may determine context information based on an identified entity (e.g., genre information to further narrow the search field), keywords, database identification (e.g., which database likely includes the target information or content), types of content (e.g., by date, genre, title, format), any other suitable information, or any combination thereof. In an illustrative example, entity identifier 221, response engine 222, prosodic engine 223, speech response engine 224, or a combination thereof may output tags 227, which may be received as input by speech generator 225. Tags 227 may include any suitable types of tags that may be associated with entities (e.g., names, places, occupations, things, attributes); types (e.g., static or dynamic); parts of speech (e.g., according to any suitable reference and may include noun, pronoun, verb, adjective, adverb, determiner, article, preposition, conjunction, interjection, digit, proper noun, compounds, contractions, etc.); keywords (e.g., influential features that are not necessarily entities); sequences (e.g., of words, parts of speech, or phrases); patterns (e.g., of words, parts of speech, or phrases); user information; prosodic characteristics (e.g., reference characteristics, modifications thereof, or modified characteristics associated with words or groupings thereof); any other information or features; or any combination thereof. Tags 227 may include text (e.g., letters, words, strings of words, symbols, or combinations thereof), numerical values, or any combinations thereof (e.g., alphanumeric identifiers).

Response engine 222 is configured to identify a text input and a text response to the text input. Response engine 222 may take as input tags 227 associated with the identified types, entities, keywords, or a combination thereof. Response engine 222 may use any suitable reference template, fuzzy math technique, artificial intelligence, statistical, or informatic technique to generate a short list of one or more input interpretations to provide to search engine 290. In an embodiment, conversation system 220 provides one or more queries to search engine 290 to retrieve a plurality of search results, which may be parsed or filtered in any suitable way. In an embodiment, search engine 290 is included as part of response engine 222, and thus need not be a separate module (e.g., although illustrated as a separate module in FIG. 2). In an embodiment, response engine 222 may determine a response based on the prosodic character of the voice input on which the text input is based. For example, if the voice input has a rate that is relatively fast, a volume that is relatively loud, or other suitable characteristics, response engine 222 may alter information about the voice input, or even the voice input itself. In an illustrative example, prosodic engine 223 may determine one or more prosodic metrics of the voice input and generate one or more tags of tags 227 to indicate the prosodic metrics.

In an embodiment, response engine 222 generates a text interpretation of the voice input. In an illustrative example, each input interpretation may include parts of speech, an order (e.g., a sequence), and other features. In an embodiment, response engine 222 uses one or more reference templates that include a respective set of features. For example, a first template may include a reference sequence "verb-article-adjective-digit," and reference keywords "play," "tune," "hear." The first template may be associated with searching for playlists among music content sources. In a further example, response engine 222 may identify one or more keywords that are associated with an input template (e.g., the keyword "weather" may be associated with an input template for reporting the weather).

As illustrated, search engine 290 receives output from conversation system 220 (e.g., response engine 222 thereof), and, based on search settings 291, generates a response to a voice input. Search engine 290 may use user profile information 270 to generate, modify, or respond to a text input or text prompt. Search engine 290 searches among data of reference information 260 using the text input or prompt. Reference information 260 may include metadata associated with a plurality of entities, content associated with the plurality of entities, or both. For example, data may include an identifier for an entity, details describing an entity, a title referring to the entity, phrases associated with the entity, links (e.g., IP addresses, URLs, hardware addresses) associated with the entity, keywords associated with the entity, any other suitable information associated with an entity, or any combination thereof. When search engine 290 identifies one or more entities or content items that match keywords of the text input, or both, search engine 290 may then provide information, content, or both to conversation system 220 (e.g., or to response engine 222 or synthesized speech response engine 224 thereof). In an embodiment, search settings 291 include which databases, entities, types of entities, types of content, types of reference information, other search criteria, or any combination thereof to effect the generation of the text input, the retrieval of the search results, or both. In an embodiment, search engine 290 may use genre information (e.g., to further narrow the search field); keywords; database identification (e.g., which database likely includes the target information or content); types of content (e.g., by date, genre, title, format); any other suitable information; or any combination thereof. The response from search engine 290 to conversation system 220 (e.g., or to response engine 222 or synthesized speech response engine 224 thereof) may include, for example, content (e.g., a displayed video, a played audio file), information (e.g., numbers, identifiers, answers), a listing of search results, links to content, any other suitable search results, or any combination thereof.

Prosodic engine 223 is configured to determine one or more prosodic metrics associated with a word, group of words, or a voice input. Prosodic engine 223 may include, for example, temporal and spectral analyzers for extracting information about an audio file. In an embodiment, prosodic engine 223 is configured to determine pitch values, note values, rate values, timber values, volume values, emotional metric values (e.g., based on prosodic metrics), any other suitable data, or any combination thereof. Prosodic engine 223 may, for example, apply one or more operations provided by an algorithm to extract metrics of the voice input.

Speech response engine 224 is configured to determine one or more prosodic metrics associated with a word, or group of words, of a synthesized speech response. In an embodiment, speech response engine 224 may include a text-to-speech module. For example, each word or phrase of the response may have associated prosodic metrics, and speech response engine 224 may generate one or more waveforms based on the response and associated prosodic metrics.

Speech generator 225 is configured to synthesize and output the synthesized speech response to the voice input. In an embodiment, speech generator 225 includes a text-to-speech engine configured to identify a text string to be synthesized as a synthesized speech response. For example, speech generator 225 may generate audio output at a speaker or other audio device based on the text string and audio settings. For example, speech generator 225 may use one or more settings including prosodic metrics corresponding to each word or a group of words to specify voice details (e.g., male/female voice, accent, rate, emphasis, or other details), playback speed, or any other suitable settings that may affect the generated audio output.

In an illustrative example, system 200 may be used to receive questions and provide audio utterances as answers to a diversified set of users. In an embodiment, the model employed by conversation system 220 may be trained per language, geographical region, user, specific dialect, any other variable, or any combination thereof that might increase accuracy of the response or prosodic character thereof. Prosodic engine 223 may be configured to extract a set of information per audio utterance (e.g., for a voice input). Conversation system 220, or prosodic engine 223 thereof, may segment the audio utterance by word or phrase (e.g., by groupings of one or more words) using any suitable algorithm or technique such as, for example, time-frequency segmentation, voice activity detection, pattern identification, any other suitable technique, or any combination thereof.

For segmented or unsegmented audio files, prosodic engine 223 may, for each segment or the entire audio file, determine pitch, note, rate, number of syllables, any other suitable characteristic, or any combination thereof. For example, prosodic engine 223 may extract the pitch of an audio file, or segment (e.g., word) thereof, by applying a fast-Fourier transform (FFT) to capture the spectral envelope of the pitch. In a further example, a set of thresholds may be used to determine a range of categories (e.g., high and low, or a ranking among predetermined intervals). Prosodic engine 223 may generate a result such as, for example, an average or median pitch of a word (e.g., or each word) or a list based on the variety of its usage in the algorithm. In a further example, prosodic engine 223 may determine a note of an audio file, or segment (e.g., word) thereof. The note (e.g., musical note) of a word, group of words, or sound may include frequency, frequency range, fundamental frequency, or combination thereof. In some circumstances, a word will be associated with only one note. In a further example, words such as "understand" may include different notes, which may be based on the number of syllables of the word. In an embodiment, prosodic engine 223 may extract the number of syllables the uttered word includes. In an embodiment, prosodic engine 223 accesses, maintains, or otherwise uses a word dictionary in which each word has an associated set of speaking rates at which the word is spoken in the real world (e.g., based on a model or user data of user profile information 270). For example, based on the range in speaking rates of a word, the duration of a particular word in the voice input may be compared to the total time duration of the voice input (e.g., on a scale between 1 to 100, or any other suitable range). In an embodiment, prosodic engine 223 may determine an age, gender, or other user characteristic, for use in determining, parsing, or categorizing prosodic metrics. In an embodiment, prosodic engine 223 determines a sentiment or type of the response (e.g., if the question has an intended binary response or quantitative response).

Figure 3:
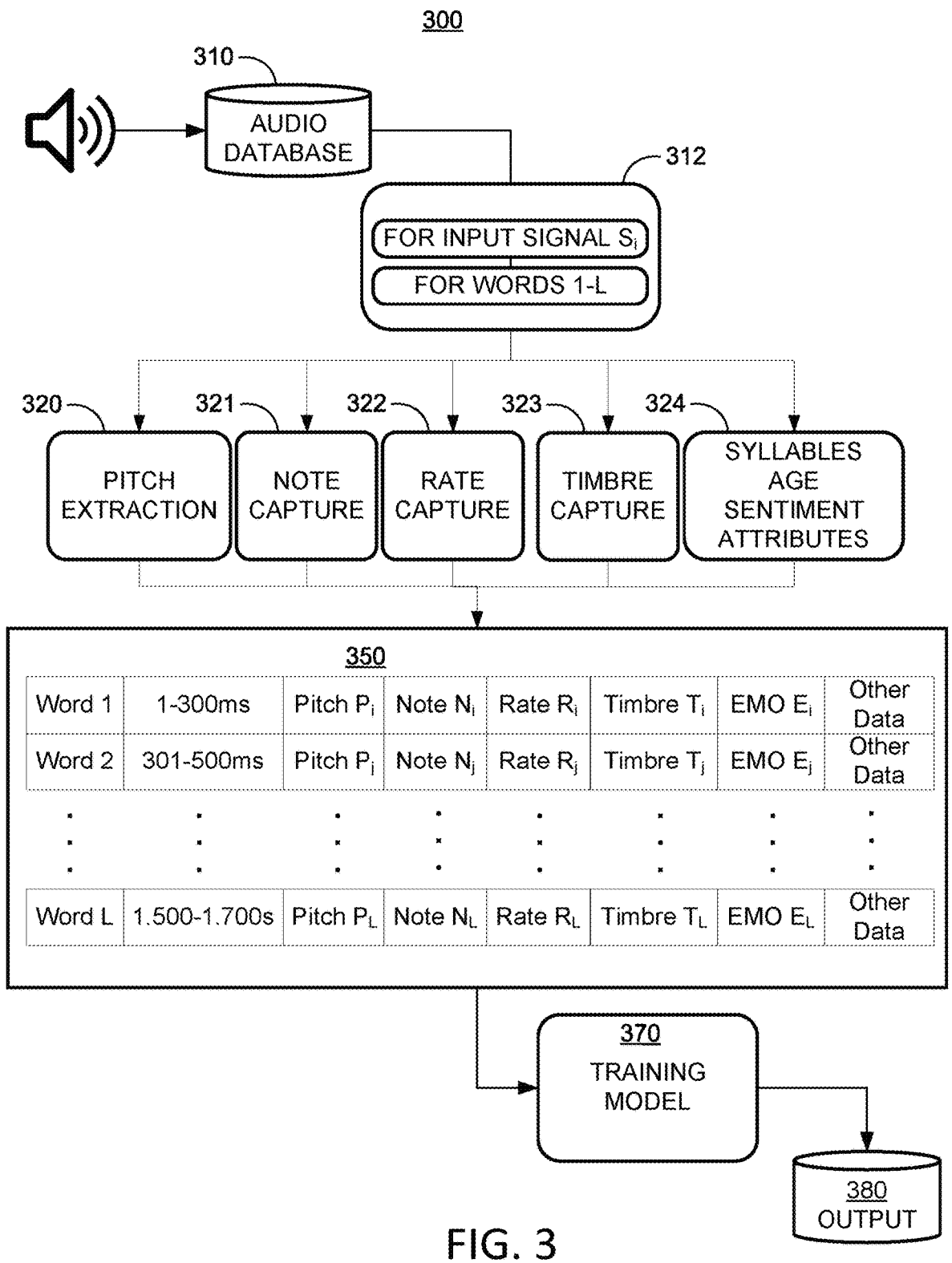
FIG. 3 shows a block diagram of an illustrative system for analyzing input-response information, in accordance with an embodiment of the present disclosure.

FIG. 3 shows a block diagram of illustrative system 300 for analyzing voice input-response information, in accordance with an embodiment of the present disclosure. As illustrated, system 300 includes audio database 310, parser 312, pitch extraction module 320, note capture module 321, rate capture module 322, timbre capture module 323, and general module 324. For example, training model 370 takes as input a plurality of voice inputs and responses, or properties derived thereof, and provides as output 380 relationships (e.g., correlations) among properties. In an embodiment, system 300 may be included as part of system 200 of FIG. 2 (e.g., conversation system 220 thereof).

Audio database 310 may include audio files, and corresponding metadata, associated with a plurality of voice inputs and responses. In an embodiment, audio database 310 may include metadata tags identifying one or more prosodic metrics associated with each voice input and response. For example, audio database 310 may include a plurality of voice inputs and corresponding responses, indexed or categorized by user, type of voice input, type of response, context, any other suitable criterion, or any combination thereof.

Parser 312 is configured to identify each voice input and response (e.g., signal $S_i$ as illustrated), and parse the voice input or response by word (e.g., for words 1, 2, . . . L as illustrated). In an embodiment, each voice input or response of audio database 310 may be parsed as stored (e.g., with metadata tags identifying each word by time or other index in the audio file), and parser 312 need not identify words but instead access the corresponding metadata tags. For example, parser 312 may identify each temporal range corresponding to a word, and then provide the word information (e.g., the portion of the signal $S_i$ corresponding to the word) to modules 320-323.

Pitch extraction module 320 is configured to extract a pitch value $P_i$ for each word, syllable thereof, or grouping of words. The pitch value may include any suitable number, range, identifier, or a combination thereof, that is indicative of pitch. For example, pitch extraction module 320 may be configured to apply a pitch template (e.g., to extract temporal and spectral information) to the portion of the signal and extract a pitch value.

Note capture module 321 is configured to determine a note value $N_i$ for each word, syllable thereof, or grouping of words. The note value may include any suitable number, range, identifier (e.g., a letter identifier such as A or A #), or a combination thereof, that is indicative of a note or note range. For example, note capture module 321 may be configured to apply a note template (e.g., to extract temporal and spectral information) to the portion of the signal and extract a pitch value. In a further example, note capture module 321 may apply a fast Fourier transform (FFT), wavelet transform, or other computational operation to the signal or portion of signal to determine the note value.

Rate capture module 322 is configured to determine a rate value $R_i$ for each word, syllable thereof, or grouping of words. The rate value may include any suitable number, range, identifier (e.g., fraction of predetermined range), or a combination thereof, that is indicative of a rate or rate range. For example, rate capture module 322 may be configured to determine a duration, an inverse of duration, or both of the word or a portion thereof as the rate value. In a further example, rate capture module 322 may apply a windowed function (e.g., to determine a window of suitable amplitude), threshold check (e.g., to determine threshold crossings of amplitude), or other suitable computational operation to the signal or portion of signal to determine the rate value.

Timbre capture module 323 is configured to determine a timbre value $T_i$ for each word, syllable thereof, or grouping of words. The timbre value may include any suitable number, range, identifier (e.g., an alphanumeric identifier), or a combination thereof, that is indicative of timbre. For example, timbre capture module 323 may be configured to apply a timbre template (e.g., to extract temporal and spectral information) to the portion of the signal and extract a timbre value. In a further example, timbre capture module 323 may apply a fast Fourier transform (FFT), wavelet transform, or other computational operation to the signal or portion of signal to determine the timbre value.

General module 324, which may be a single module or a collection of modules, is configured to determine any other suitable metric not determined by modules 320-323. For example, general module 324 may be configured to determine a number of syllables of each word, thus pre-processing the signal for modules 320-323. In a further example, general module 324 may be configured to determine characteristics of the entity (e.g., the user) associated with the signal such as age, gender, dialect, language, accent, location, any other demographic information, reference prosodic information associated with the entity, or a combination thereof. In a further example, general module 324 may be configured to identify or otherwise determine a sentiment, tone, or emotional indicator associated with a word, syllable thereof, or grouping of words.

Module 350 is configured to manage the inputs to training model 370. In an embodiment, module 350 is configured to tabulate, compile, index, store, format (e.g., or reformat), convert (e.g., normalize, change units, non-dimensionalize, scale, shift, or otherwise perform an operation to convert), perform any other suitable data manipulation or operation, or any combination thereof. In an embodiment, each of modules 320-324 is configured to output data formatted for input to training model 370, and accordingly, module 350 need not be a separate module (e.g., although illustrated as being separate in FIG. 3). In an embodiment, module 350 generates an input file, having a predetermined format, for use as input to training model 370. As illustrated, module 350 is configured to tabulate, at least, word index, time interval (e.g., word temporal arrangement in the signal), pitch values, note values, rate values, timber values, emotional metric values, any other suitable data, or any combination thereof.

Training model 370 is configured to accept as input data from module 350, extracted from data of audio database 310; perform a computation; and provide output 380. For example, the data provided as input by module 350 (e.g., the "training data") is extracted for a set of voice inputs and responses. The training data may include, for example, millions of questions and answers, the quantity of which may affect the accuracy of the prediction system. Training model 370 does not necessarily use the actual audio data of audio database 310 (e.g., the audio signals themselves), but rather the features extracted and provided by module 350. Training model 370 executes an algorithm (e.g., "trains" the data), and generates output labels (e.g., output 380). In an embodiment, output 380 may include a sequence of labels for features of each answer correlated to features of the questions. In an embodiment, output 380 includes links (e.g., correlations, probabilities, confidences) between features of the voice input and response. In an embodiment, training model 370 may accept as input an emotion metric, word domain (e.g., predetermined word types), user vocabulary proficiency, any other suitable metric, or any combination thereof.

In an illustrative example, several voice inputs and responses are illustrated in Table 1 below. Each voice input of Table 1 represents an alternative of "How are you?" that might commonly be used to greet or check on another. Each answer represents a possible response (e.g., there are many more answers to the voice input than illustrated in Table 1, which is provided as an example), depending upon the respondent's status and circumstance.

TABLE 1

Illustrative voice inputs and responses.

| Scenario | Stimulus | Answer |
|---|---|---|
| 1 | How are you doing today? | I am good. |
| 2 | How are you doing today? | I am doing fine. |
| 3 | How are you? | I am fine. |
| 4 | How are you doing? | Not bad. |
| 5 | How are things with you? | I am sick. |

In an embodiment, features are extracted for the corresponding answers under each scenario (e.g., [question features, answer features]=>answer features). In an embodiment, the answer features are used as input features to clearly differentiate among types of answers corresponding to the same question. For example, each answer may have an associated sentiment depending upon how the question was asked (e.g., the prosodic character of the voice input may suggest the sentiment). Features may include, for example, category of question, question related metadata, user characteristic, any other suitable feature, or any combination thereof.

System 300 may analyze each voice input and response (also referred to herein as an "answer") to extract metrics and other suitable information. For example, in the context of an illustrative voice input "How are you doing today?", system 300 may identify the features illustrated in Table 2 below. System 300 may determine features for a plurality of voice inputs and responses (e.g., as illustrated in Table 2 for a single voice input). For example, referencing Table 2, system 300, and more particularly module 350 thereof, determines pitch indicator, pitch for

TABLE 2

Illustrative prosodic metrics associated with a voice input.

| Voice input | How | are | you | doing | today? |
|---|---|---|---|---|---|
| Pitch | High | High | High | Low | Low |
| Pitch/frame | [80, 90, 100 . . . 60] | [60, 60, 70] | [50, 50, 60] | [49, 48, 49] | [40, 45, 48] |
| Pitch Interval | Octave 1 | Octave 1 | Octave 2 | Octave 2 | Octave 2 |
| Note | [E, E#] | [F] | [G] | [B♭] | [C#, D] |
| Speed | 50 | 51 | 50 | 48 | 55 |
| Syllables | 1 | 1 | 1 | 2 | 2 |
| Age | 25 | 25 | 25 | 25 | 25 |
| Sentiment | Casual | Casual | Casual | Casual | Casual | each frame, pitch interval, note(s), speaking speed (e.g., rate), number of syllables, age of the entity associated with the voice input (e.g., for a particular user), and sentiment (e.g., an estimated or inputted emotion and or intent-based metric. In a further example, other sentiments for the voice input of Table 2 may include "concerned," "suggestive," "laughing," or "curious."

In an illustrative example, referencing an audio signal associated with a voice input, system 300 may determine the meaning of the question and accordingly recognize an intent of the speech-to-text response (e.g., audio transcription). In an embodiment, natural language understanding models are applied to the voice input to determine a more correct and accurate answer for the voice input. In an embodiment, module 350 determines prosodic character of a response. For example, an audio acoustic model for the answer may be provide by a text-to-speech module. In an embodiment, question and answer audio signals are submitted to training model 370, wherein the model is used to predict the right set of audio features to be applied for each phrase and word. In an embodiment, to improve naturalness, the predicted features are post-processed using interpolation to manage the prosodic character and prosodic transitions thereof (e.g., transitions between words of the generated response). For example, interpolation may be used if the predicted prosodic metrics of an audio signal for adjacent words or phrases have disparate, unmatched, or conflicting values (e.g., are not sufficiently close to each other).

Any of the illustrative systems, components, and processes described in the context of FIGS. 1-3 may be implemented using any suitable hardware, devices, software, or combination thereof. For example, the systems and devices of FIGS. 4-5 may be used to implement a conversation system, speech processing system, voice input engine, any other suitable system, component, or engine, or any combination thereof. For example, a user may access content, an application (e.g., for interpreting and responding to a voice input), and other features from one or more of their devices (i.e., user equipment or audio equipment), one or more network-connected devices, one or more electronic devices having a display, or a combination thereof. Any of the illustrative techniques of the present disclosure may be implemented by a user device, a device providing a display to a user, or any other suitable control circuitry configured to respond to a voice input and generate for display content to a user.

Figure 4:
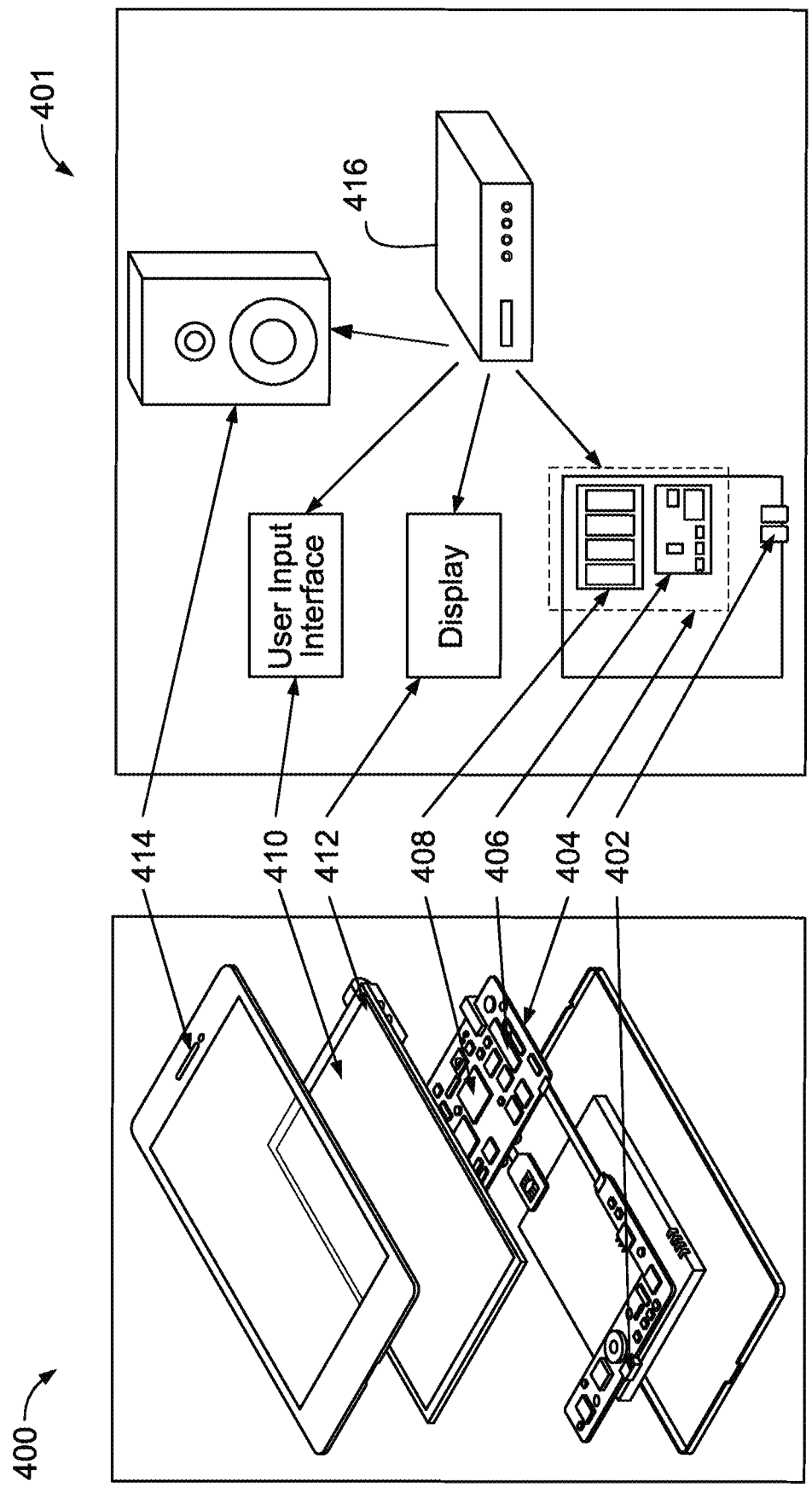
FIG. 4 is a block diagram of an illustrative user device, in accordance with an embodiment of the present disclosure.

FIG. 4 shows generalized embodiments of an illustrative user device. User equipment system 401 may include set-top box 416 that includes, or is communicatively coupled to, display 412, audio equipment 414, and user input interface 410. In an embodiment, display 412 may include a television display or a computer display. In an embodiment, user input interface 410 is a remote-control device. Set-top box 416 may include one or more circuit boards. In an embodiment, the one or more circuit boards include processing circuitry, control circuitry, and storage (e.g., RAM, ROM, hard disk, removable disk, etc.). In an embodiment, circuit boards include an input/output path. Each one of user device 400 and user equipment system 401 may receive content and data via input/output (hereinafter "I/O") path 402. I/O path 402 may provide content and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing. While set-top box 416 is shown in FIG. 4 for illustration, any suitable computing device having processing circuitry, control circuitry, and storage may be used in accordance with the present disclosure. For example, set-top box 416 may be replaced by, or complemented by, a personal computer (e.g., a notebook, a laptop, a desktop), a network-based server hosting a user-accessible client device, a non-user-owned device, any other suitable device, or any combination thereof.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In an embodiment, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In an embodiment, control circuitry 404 executes instructions for an application stored in memory (e.g., storage 408). Specifically, control circuitry 404 may be instructed by the application to perform the functions discussed above and below. For example, the application may provide instructions to control circuitry 404 to generate the media guidance displays. In some implementations, any action performed by control circuitry 404 may be based on instructions received from the application.

In some client/server-based embodiments, control circuitry 404 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device such as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, for example, may be used to supplement storage 408 or instead of storage 408.

A user may send instructions to control circuitry 404 using user input interface 410. User input interface 410, display 412, or both may include a touchscreen configured to provide a display and receive haptic input. For example, the touchscreen may be configured to receive haptic input from a finger, a stylus, or both. In an embodiment, user device 400 may include a front-facing screen and a rear-facing screen, multiple front screens, or multiple angled screens. In an embodiment, user input interface 410 includes a remote-control device having one or more microphones, buttons, keypads, any other components configured to receive user input, or combinations thereof. For example, user input interface 410 may include a handheld remote-control device having an alphanumeric keypad and option buttons. In a further example, user input interface 410 may include a handheld remote-control device having a microphone and control circuitry configured to receive and identify voice commands and transmit information to set-top box 416.

Audio equipment 414 may be provided as integrated with other elements of each one of user device 400 and user equipment system 401 or may be stand-alone units. The audio component of videos and other content displayed on display 412 may be played through speakers of audio equipment 414. In an embodiment, the audio may be distributed to a receiver (not shown), which processes and outputs the audio via speakers of audio equipment 414. In an embodiment, for example, control circuitry 404 is configured to provide audio cues to a user, or other audio feedback to a user, using speakers of audio equipment 414. Audio equipment 414 may include a microphone configured to receive audio input such as voice commands and speech (e.g., including voice inputs). For example, a user may speak letters or words that are received by the microphone and converted to text by control circuitry 404. In a further example, a user may voice commands that are received by the microphone and recognized by control circuitry 404.

An application (e.g., for managing voice inputs) may be implemented using any suitable architecture. For example, a stand-alone application may be wholly implemented on each one of user device 400 and user equipment system 401. In some such embodiments, instructions for the application are stored locally (e.g., in storage 408), and data for use by the application is downloaded on a periodic basis (e.g., from an out-of-band feed, from an Internet resource, or using another suitable approach). Control circuitry 404 may retrieve instructions for the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

In an embodiment, the application is a client/server-based application. Data for use by a thick or thin client implemented on each one of user device 400 and user equipment system 401 is retrieved on demand by issuing requests to a server remote from each one of user device 400 and user equipment system 401. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on user device 400. This way, the processing of the instructions is performed remotely by the server while the resulting displays, which may include text, a keyboard, or other visuals, are provided locally on user device 400. User device 400 may receive inputs from the user via input interface 410 and transmit those inputs to the remote server for processing and generating the corresponding displays. For example, user device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to user device 400 for presentation to the user.

In an embodiment, the application is downloaded and interpreted or otherwise run by an interpreter or virtual machine (e.g., run by control circuitry 404). In an embodiment, the application may be encoded in the ETV Binary Interchange Format (EBIF), received by control circuitry 404 as part of a suitable feed, and interpreted by a user agent running on control circuitry 404. For example, the application may be an EBIF application. In an embodiment, the application may be defined by a series of JAVA-based files that are received and run by a local virtual machine or other suitable middleware executed by control circuitry 404.

Figure 5:
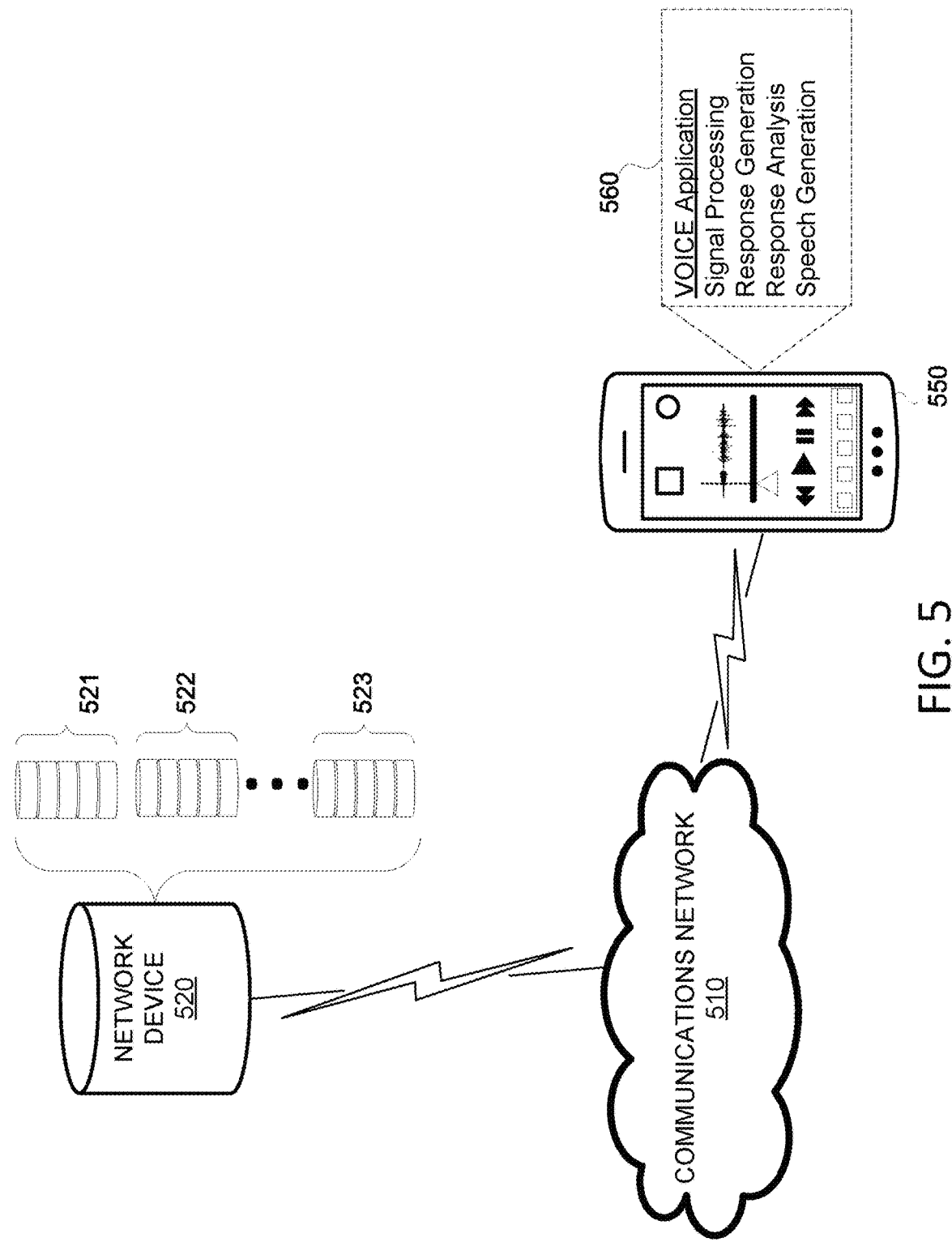
FIG. 5 shows a block diagram of an illustrative system for responding to a voice input, in accordance with an embodiment of the present disclosure.

FIG. 5 shows a block diagram of illustrative network arrangement 500 for responding to a voice input, in accordance with an embodiment of the present disclosure. Illustrative system 500 may be representative of circumstances in which a user provides a voice input at user device 550, views content on a display of user device 550, or both. In system 500, there may be more than one type of user device, but only one is shown in FIG. 5 to avoid overcomplicating the drawing. In addition, each user may utilize more than one type of user device and also more than one of each type of user device. User device 550 may be the same as user device 400 of FIG. 4, user equipment system 401, any other suitable device, or any combination thereof.

User device 550, illustrated as a wireless-enabled device, may be coupled to communications network 510 (e.g., connected to the Internet). For example, user device 550 is coupled to communications network 510 via a communications path (e.g., which may include an access point). In an embodiment, user device 550 may be a computing device coupled to communications network 510 via a wired connection. For example, user device 550 may also include wired connections to a LAN, or any other suitable communications link to network 510. Communications network 510 may be one or more networks including the Internet, a mobile phone network, mobile voice or data network (e.g., a 4G or LTE network), cable network, public switched telephone network, or other types of communications network or combinations of communications networks. Communications paths may include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although communications paths are not drawn between user device 550 and network device 520, these devices may communicate directly with each other via communications paths, such as those described above, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. Devices may also communicate with each other directly through an indirect path via communications network 510.

System 500, as illustrated, includes network device 520 (e.g., a server or other suitable computing device) coupled to communications network 510 via a suitable communications path. Communications between network device 520 and user device 550 may be exchanged over one or more communications paths but are shown as a single path in FIG.

5 to avoid overcomplicating the drawing. Network device 520 may include a database, one or more applications (e.g., as an application server, host server). A plurality of network entities may exist and be in communication with network 510, but only one is shown in FIG. 5 to avoid overcomplicating the drawing. In an embodiment, network device 520 may include one source device. In an embodiment, network device 520 implements an application that communicates with instances of applications at many user devices (e.g., user device 550). For example, an instance of a social media application may be implemented on user device 550, with application information being communicated to and from network device 520, which may store profile information for the user (e.g., so that a current social media feed is available on other devices than user device 550). In a further example, an instance of a search application may be implemented on user device 550, with application information being communication to and from network device 520, which may store profile information for the user, search histories from a plurality of users, entity information (e.g., content and metadata), any other suitable information, or any combination thereof.

In an embodiment, network device 520 includes one or more types of stored information, including, for example, entity information, metadata, content, historical communications and search records, user preferences, user profile information, any other suitable information, or any combination thereof. Network device 520 may include an applications-hosting database or server, plug-ins, a software developers kit (SDK), an applications programming interface (API), or other software tools configured to provide software (e.g., as downloaded to a user device), run software remotely (e.g., hosting applications accessed by user devices), or otherwise provide applications support to applications of user device 550. In an embodiment, information from network device 520 is provided to user device 550 using a client/server approach. For example, user device 550 may pull information from a server, or a server may push information to user device 550. In an embodiment, an application client residing on user device 550 may initiate sessions with network device 520 to obtain information when needed (e.g., when data is out-of-date or when a user device receives a request from the user to receive data). In an embodiment, information may include user information (e.g., user profile information, user-created content). For example, the user information may include current and/or historical user activity information such as what content transactions the user engages in, searches the user has performed, content the user has consumed, whether the user interacts with a social network, any other suitable information, or any combination thereof. In an embodiment, the user information may identify patterns of a given user for a period of time. As illustrated, network device 520 includes entity information for a plurality of entities. Entity information 521, 522, and 523 include metadata for the respective entities. Entities for which metadata is stored in network device 520 may be linked to each other, may be referenced to each other, may be described by one or more tags in metadata, or a combination thereof.

In an embodiment, an application may be implemented on user device 550, network device 520, or both. For example, the application may be implemented as software or a set of executable instructions, which may be stored in storage of the user device 550, network device 520, or both and executed by control circuitry of the respective devices. In an embodiment, an application may include an audio recording application, a speech-to-text application, a text-to-speech application, a voice-recognition application, or a combination thereof, that is implemented as a client/server-based application, where only a client application resides on user device 550, and a server application resides on a remote server (e.g., network device 520). For example, an application may be implemented partially as a client application on user device 550 (e.g., by control circuitry of user device 550) and partially on a remote server as a server application running on control circuitry of the remote server (e.g., control circuitry of network device 520). When executed by control circuitry of the remote server, the application may instruct the control circuitry to generate a display and transmit the generated display to user device 550. The server application may instruct the control circuitry of the remote device to transmit data for storage on user device 550. The client application may instruct control circuitry of the receiving user device to generate the application displays.

In an embodiment, the arrangement of system 500 is a cloud-based arrangement. The cloud provides access to services, such as information storage, searching, messaging, or social networking services, among other examples, as well as access to any content described above, for user devices. Services can be provided in the cloud through cloud-computing service providers, or through other providers of online services. For example, the cloud-based services can include a storage service, a sharing site, a social networking site, a search engine, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a social media application, a desktop application, or a mobile application, and may include an audio recording application, a speech-to-text application, a text-to-speech application, a voice-recognition application and/or any combination of access applications of the same. User device 550 may be a cloud client that relies on cloud computing for application delivery, or user device 550 may have some functionality without access to cloud resources. For example, some applications running on user device 550 may be cloud applications (e.g., applications delivered as a service over the Internet), while other applications may be stored and run on user device 550. In an embodiment, user device 550 may receive information from multiple cloud resources simultaneously.

In an illustrative example, a user may speak a voice input to user device 550. The voice input is recorded by an audio interface of user device 550, sampled and digitized by application 560, and converted to a text input by application 560. Application 560 may then identify entities of the text input, identify one or more dynamic types of the text input, and generate resultant tags. Application 560 then uses the dynamic tags to generate a input interpretation and use the interpretation to perform a search or communicate the interpretation to network device 520 to perform the search. Network device 520 may identify an entity associated with the input interpretation, content associated with the input interpretation, or both and provide that information to user device 550.

Application 560 may include any suitable functionality such as, for example, audio recording, speech recognition, speech-to-text conversion, text-to-speech conversion, input generation, types identification, search engine functionality, content retrieval, display generation, content presentation, metadata generation, database functionality, or a combination thereof. In an embodiment, aspects of application 560 are implemented across more than one device. In an embodiment, application 560 is implemented on a single device. For example, entity information 521, 522, and 523 may be stored in memory storage of user device 550, and may be accessed by application 560.

Figure 6:
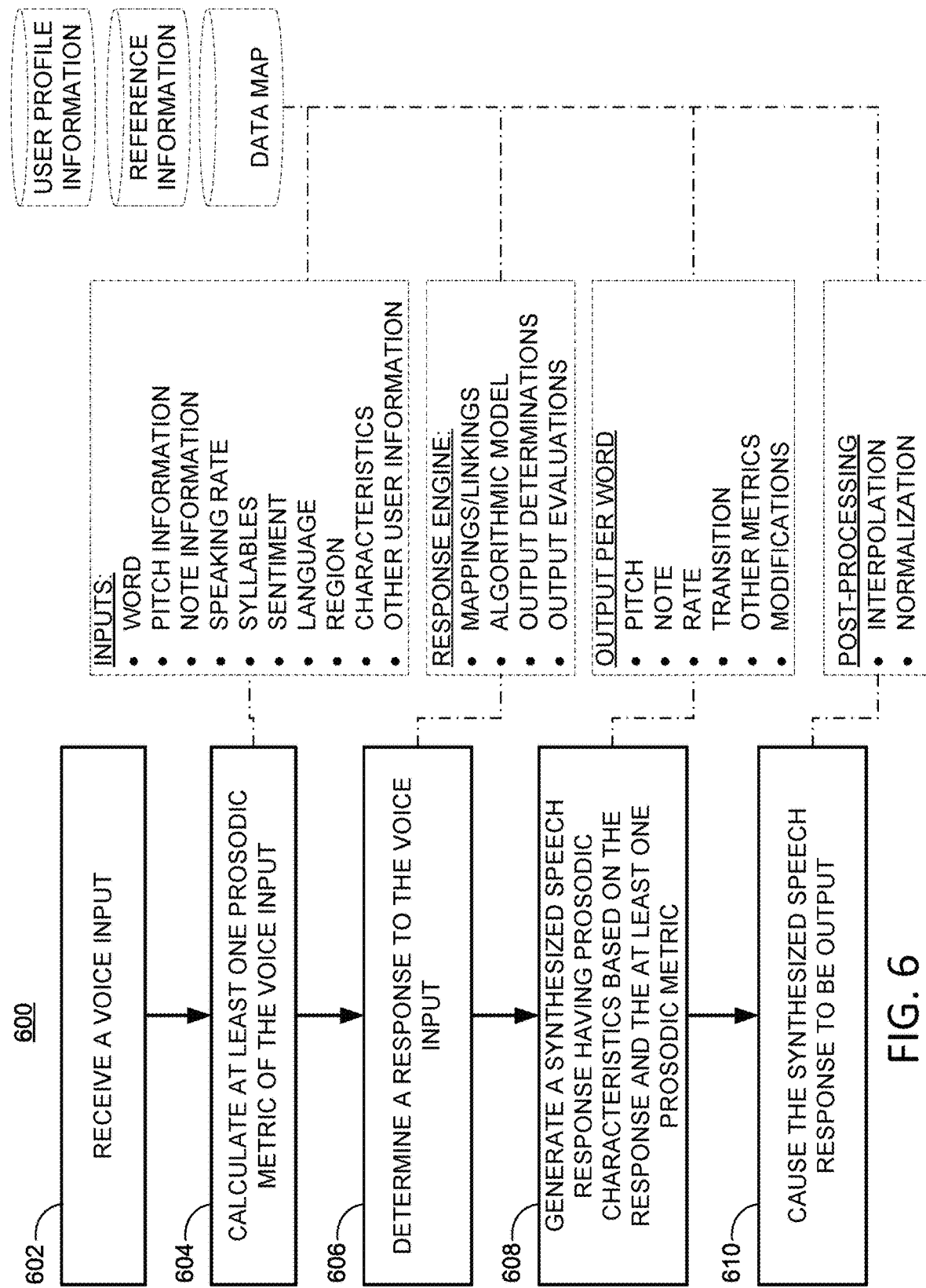
FIG. 6 shows a flowchart of an illustrative process for generating a response to a voice input, in accordance with an embodiment of the present disclosure.

FIG. 6 shows a flowchart of illustrative process 600 for generating a response to a voice input, in accordance with an embodiment of the present disclosure. For example, a voice application may perform process 600, implemented on any suitable hardware such as user device 400 of FIG. 4, user equipment system 401 of FIG. 4, user device 550 of FIG. 5, network device 520 of FIG. 5, any other suitable device, or any combination thereof. In a further example, the voice application may be an instance of application 560 of FIG. 5.

At step 602, the voice application receives a voice input. A voice input may include one or more words, and generally includes a plurality of words. In an embodiment, an audio interface (e.g., audio equipment 414, user input interface 410, or a combination thereof) may include a microphone or other sensor that receives audio input and generates an electronic signal. In an embodiment, the audio input is received at an analog sensor, which provides an analog signal that is conditioned, sampled, and digitized to generate an audio file. In an embodiment, the audio file is stored in memory (e.g., storage 408). In an embodiment, the voice application includes a user interface (e.g., user input interface 410), which allows a user to record, play back, alter, crop, visualize, or otherwise manage audio recording. For example, in an embodiment, the audio interface is always configured to receive audio input. In a further example, in an embodiment, the audio interface is configured to receive audio input when a user provides an indication to a user input interface (e.g., by selecting a soft button on a touchscreen to begin audio recording). In a further example, in an embodiment, the audio interface is configured to receive audio input and begins recording when speech or other suitable audio signals are detected. The voice application may include any suitable conditioning software or hardware for converting audio input to a stored audio file. For example, the voice application may apply one or more filters (e.g., low-pass, high-pass, notch filters, or band-pass filters), amplifiers, decimators, or other conditionings to generate the audio file. In a further example, the voice application may apply any suitable processing to a conditioned signal to generate an audio file such as compression, transformation (e.g., spectral transformation, wavelet transformation), normalization, equalization, truncation (e.g., in a time or spectral domain), any other suitable processing, or any combination thereof. In an embodiment, at step 602, the control circuitry receives an audio file from a separate application, a separate module of the voice application, based on a user input, or any combination thereof. For example, at step 602, the control circuitry may receive a voice input as an audio file stored in storage (e.g., storage 408), for further processing. In an embodiment, step 602 need not be performed, and process 600 includes analyzing an existing text input (e.g., stored in memory, or converted to text by a separate application).

In an embodiment, the voice application may store snippets (i.e., clips of short duration) of recorded audio during detected speech, and process the snippets. In an embodiment, the voice application stores relatively large segments of speech (e.g., more than 10 seconds) as an audio file, and processes the file. In an embodiment, the voice application may process speech to detect words by using a continuous computation. For example, a wavelet transform may be performed on speech in real time, providing a continuous, if slightly time-lagged, computation of speech patterns (e.g., which could be compared to a reference to identify words). In an embodiment, the voice application may detect words, as well as which user uttered the words (e.g., voice recognition), in accordance with the present disclosure.

In an embodiment, at step 602, the voice application identifies one or more entities of the voice input. In an embodiment, the voice application identifies keywords associated with entities such as, for example, words, phrases, names, places, channels, media asset titles, or other keywords, using any suitable criteria to identify keywords from an audio input. The voice application may process words using any suitable word detection technique, speech detection technique, pattern recognition technique, signal processing technique, or any combination thereof. For example, the voice application may compare a series of signal templates to a portion of an audio signal to find whether a match exists (e.g., whether a particular word is included in the audio signal). In a further example, the voice application may apply a learning technique to better recognize words in voice inputs. In an illustrative example, the voice application may compare words or phrases of the text input (e.g., converted from the voice input) to nodes of an information graph (e.g., storing information and relationships among a large plurality of entities). For a voice input "movies of Tom Hanks," the voice application identifies the words "movies" "Tom" and "Hanks." The voice application may identify matches for each word among nodes of the information graph. In an embodiment, at step 602, the voice application compares text of the voice input to a database that includes entity information (e.g., reference information 150 of FIG. 1, or reference information 260 of FIG. 2). For example, the database may include stored information associated with a plurality of entities, associated metadata, and other suitable information for linking entities. The voice application may output a list of entities mapped to each word or phrase of the text input.

In an embodiment, at step 602, the voice application adds detected words to a list of words detected in the voice input. In an embodiment, the voice application stores these detected words in memory. For example, the voice application may store in memory words as a collection of ASCII characters (i.e., 8-bit code), a pattern (e.g., indicating a speech signal reference used to match the word), an identifier (e.g., a code for a word), a string, any other datatype, or any combination thereof. In an embodiment, the voice application may add words to memory as they are detected. For example, the voice application may append a string of previously detected words with a newly detected word, add a newly detected word to a cell array of previously detect words (e.g., increase the cell array size by one), create a new variable corresponding to the newly detected word, create a new file corresponding to the newly created word, or otherwise store one or more words detected at step 602.

At step 604, the voice application calculates at least one prosodic metric of the voice input. The at least one prosodic metric may include pitch, note, duration, prominence, timbre, rate, rhythm, any other suitable metric, and any combination thereof. In an embodiment, and wherein the voice input comprises a plurality of words, the voice application may determine a prosodic metric corresponding to each word of the plurality of words.

In an embodiment, at step 604, the voice application generates a set of tags based on the calculated prosodic metric(s). In an embodiment, each word of the text input (e.g., determined based on conversion of the voice input) is assigned one or more tags that may correspond to respective prosodic metrics. In an illustrative example, each word or phrase of the voice input may have a respective plurality of associated tags, each associated with a prosodic metric. The voice application may store the tags (e.g., tags 227 of FIG. 2) in storage (e.g., storage 408 of FIG. 4).

In an embodiment, the voice application may perform steps 602 and 604 as a single step. For example, steps 602 and 604 may be combined (e.g., performed by conversation system 220, or prosodic engine 223 thereof, of FIG. 2).

At step 606, the voice application determines a response to the voice input. In an embodiment, the voice application provides a text representation of the voice input to a search engine or query engine (e.g., search engine 290 of FIG. 2), which returns a response. In an embodiment, the voice application may determine the response, and need not submit the input to a separate application or module. In an illustrative example, the voice application may generate an input interpretation based on the recorded voice input, wherein the input interpretation matches an input template. The input template may include a predetermined question format allowing for more predictable searching in providing a response, a response to predetermined commands, a response to a statement, any other suitable response, or any combination thereof. In an embodiment, the resultant input is the input interpretation that most closely matches a reference template.

At step 608, the voice application generates a synthesized speech response having prosodic characteristics based on the response and based on the at least one prosodic metric. In an embodiment, for example, the voice application or a text-to-speech module thereof generates one or more waveforms, which may be outputted as control signals to an audio device.

In an embodiment, at step 608, the voice application determines predicted prosodic characteristics of the response using a model, and modifies the predicted prosodic characteristics to generate the prosodic characteristics of the synthesized speech response. The model may, for example, include the results of a training model (e.g., training model 370 of FIG. 3), which may include correlations, probabilities, confidences, and other values indicative of the model output. In an embodiment, the voice application may select from among a plurality of versions of a word, each having a particular prosodic character, for the version that most matches the desired or predicted prosodic character. For example, the voice application may access a database that stores a plurality of audio files, each corresponding to a word, phrase, or grouping thereof, and may select the audio file having associated prosodic metrics that are most similar to the predicted metrics.

At step 610, the voice application causes the synthesized speech response to be outputted. In an embodiment, the synthesized speech response is outputted by a speaker coupled to a text-to-speech module configured to generate audio based on text input and settings (e.g., settings including prosodic characteristics). For example, the voice application may generate control signals and transmit the control signals to audio equipment (e.g., audio equipment 414) such as a speaker. In an embodiment, the voice application may implement the output using a synthesized speech response engine (e.g., synthesized speech response engine 224 of FIG. 2) configured to generate control signals based on waveforms.

In an embodiment, at step 610, the voice application modifies the prosodic characteristics based on an interpolation operation affecting transitions in the synthesized speech response. The voice application may apply interpolation, normalization, shifting (e.g., in time, amplitude, or frequency), any other processing, or any combination thereof to modify the sound of the response. For example, at the transition between words, phonemes, or phrases, transitions exist. If the character of the transitions (e.g., the smoothness, the change, the difference) does not sound natural to a user, the naturalness of the response may suffer, even if the words themselves are synthesized with the desired prosodic character. The voice application may apply any suitable technique such as filtering, averaging (e.g., applying a moving average), scaling (e.g., adjusting the amplitude of a metric associated with a word in view of an adjacent word), truncating (e.g., to reduce high or low peaks in amplitude in the time or frequency domain), windowing (e.g., with a window function applied in the time or frequency domain), any other suitable processing technique, or any combination thereof.

In an embodiment, the voice application determines an emotion metric based on the voice input, and then determines the prosodic characteristics further based on the emotion metric. An emotion metric may include an indicator such as, for example, angry, happy, flustered, sad, annoyed, scared, worried, depressed, etc. In an embodiment, the voice application determines an emotion metric indicative of a sentiment or condition such as, for example, tired, lazy, curious, concerned, casual, drunk, nervous, detached, attentive, etc. The voice application may determine the emotion metric based on the voice input (e.g., keywords, or prosodic metrics of the voice input), based on a response to the voice input (e.g., keywords, or prosodic metrics of the response), context (e.g., location, circumstance), or a combination thereof. For example, based on user profile information, the voice application may determine that a spoken voice input associated with the user is faster and less verbose when that user is in a hurry, and accordingly, the voice application may provide a faster, less wordy response (e.g., altering both the word content and prosodic character thereof).

In an embodiment, the voice application determines the prosodic characteristics further based on user voice input history, user language, user characteristics, user location, user preferences, metadata tags associated with the user, any other suitable user information (e.g., of user profile information 160 of FIG. 1, or user profile information 270 of FIG. 2), or any combination thereof.

In an embodiment, the voice application may identify a plurality of reference responses that are associated with the voice input. The application may determine the prosodic characteristics of the synthesized speech response based on a relationship between the first prosodic metric (of the voice input) and the plurality of reference responses. In an embodiment, the voice application identifies which of the plurality of reference responses include respective reference prosodic characteristics that are most closely related to the at least one prosodic metric of the voice input. The voice application then determines prosodic characteristics of the synthesized speech response further based on the identified reference response. In an embodiment, the voice application identifies which of the plurality of reference responses is most closely related to the at least one prosodic metric, wherein the prosodic characteristics of the synthesized speech response are further based on the identified reference response. For example, the voice application may select a response that most matches the prosodic character of the voice input, without considering the prosodic character of the response. To illustrate, if a voice input has a prosodic character indicative of haste (e.g., "What time does Ed's hardware close?" yelled quickly), the voice application may determine a response that is short (e.g., "5" rather than "Ed's closes at 5 pm today"). The voice application may, but need not, also modify the prosodic characteristics of the response (e.g., "5" voiced quickly rather than at a default rate).

Figure 7:
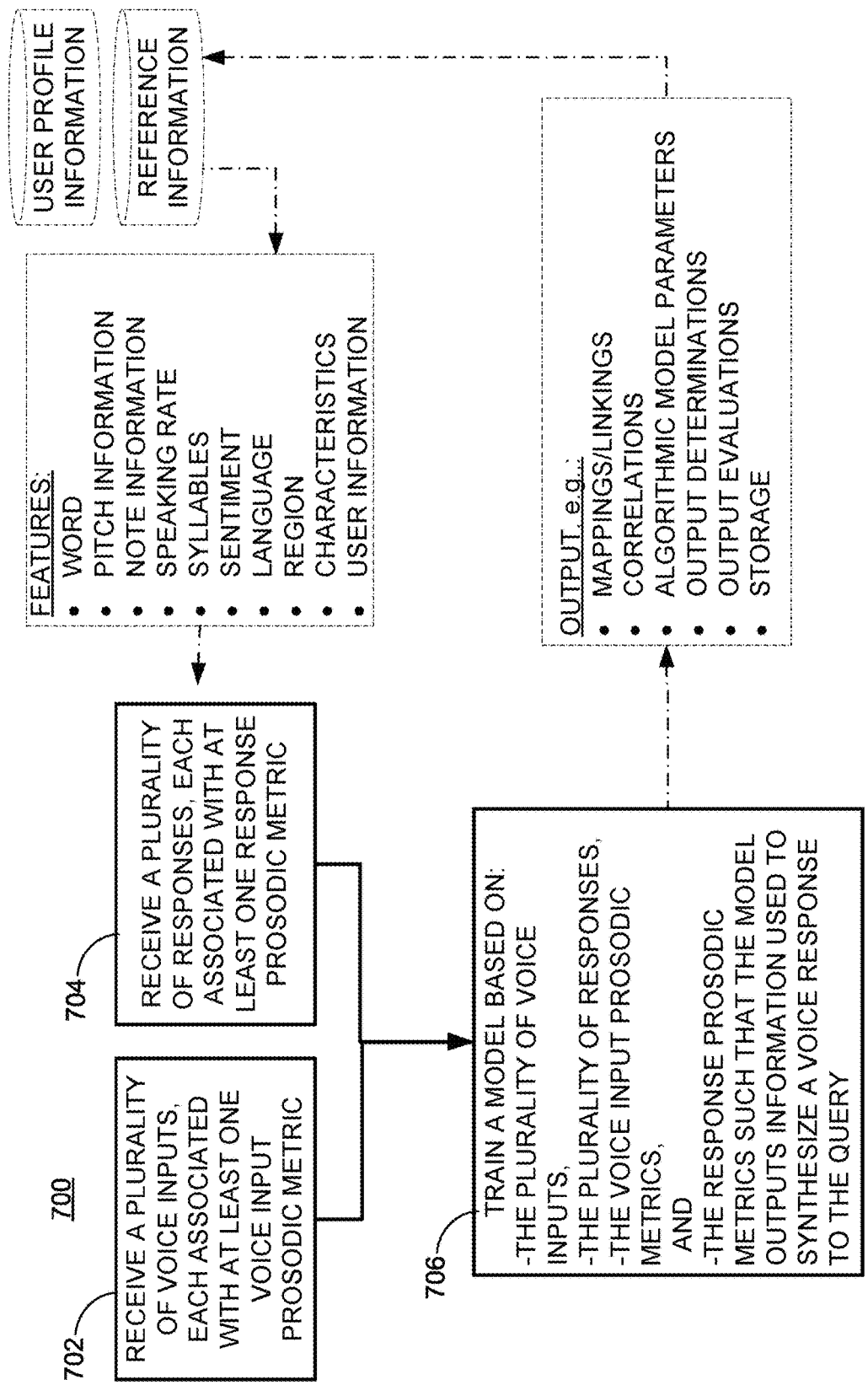
FIG. 7 shows a flowchart of an illustrative process for training a system to generate responses to voice inputs, in accordance with an embodiment of the present disclosure.

FIG. 7 shows a flowchart of illustrative process 700 for training a system to generate responses to voice inputs, in accordance with an embodiment of the present disclosure. For example, an application may perform process 700, implemented on any suitable hardware of FIGS. 4-5, any other suitable device, or any combination thereof. In a further example, process 700 may be implemented by system 300 of FIG. 3. In a further example, the application may be implemented at any suitable time, and in response to any suitable trigger (e.g., which need not include a user voice input or user input). In a further example, the results of process 700 may be used as reference information (e.g., reference information 150 of FIG. 1, reference information 260 of FIG. 2, or a combination thereof) for process 600 of FIG. 6. In an embodiment, process 700 includes the application inputting one or more voice inputs with known properties to a model framework, and outputting probabilistic metrics corresponding to one or more features of the voice inputs (e.g., hidden features, specified features, or both).

At step 702, the application receives a plurality of voice inputs, each associated with at least one respective voice input prosodic metric. The at least one voice input prosodic metric may include, for example, pitch, note, duration, prominence, timbre, rate, rhythm, any other suitable metric, or any combination thereof. The plurality of voice inputs may be included in a database, (e.g., audio database 310 of FIG. 3).

At step 704, the application receives a plurality of responses, each associated with at least one respective response prosodic metric. The at least one response prosodic metric may include, for example, pitch, note, duration, prominence, timbre, rate, rhythm, any other suitable metric, or any combination thereof. In an embodiment, each voice input of the plurality of voice inputs is linked with a respective set of responses of the plurality of responses. The plurality of responses may be included in a database, (e.g., audio database 310 of FIG. 3).

At step 706, the application trains the model based on the plurality of voice inputs, the plurality of responses, the voice input prosodic metrics, and the response prosodic metrics such that the model outputs information used to generate the synthesized speech response to the voice input. In an embodiment, the application applies machine learning techniques such as, for example, Convolutional Neural Networks or Recurrent Neural Network or LSTM. For example, the list of features used for training may cover basic prosodic features that affect the sound of a voice input, the sound of a response, user profile information, or a combination thereof. The input and outputs of the model may be multi-labelled to generate a predicted pitch and prosody that will engage the user. The application allows for an increase in the naturalness of responses, an increase in the user engagement, the user focusing less attention on reacting to a unnatural sounding response, or a combination thereof.

At step 706, the application may apply a model to generate reference information. For example, based on the training data input at steps 702 and 704, the application applies the model to determine features and probabilities. The model may include, for example, any other suitable model of any suitable type, or any combination thereof to achieve pattern recognition, prediction, and correlation. For example, the model may include a plurality of features that may include the inputs, or against which the inputs are analyzed, to determine probabilities that each feature correlates to some other feature.

At step 706, or following step 706, the application may store the model and the reference information (e.g., in reference information 150 of FIG. 1). In an embodiment, the plurality of voice inputs and the plurality of responses are associated in a database (e.g., the aforementioned database), and the application retrieves the plurality of voice inputs and the plurality of responses from the database. The application may store the reference information in any suitable format. For example, the reference information, along with any suitable metadata, may be stored as a data structure, a map, pickled data (e.g., stored as a binary file), text file (e.g., a comma separated value (CSV) file), any other suitable format, or any combination thereof. The application may store the reference information on any suitable memory storage that may be included in a user device (e.g., a smartphone), network device (e.g., a server), a computer, any other computing device, or any combination thereof (e.g., distributed among any suitable number of devices).

In an illustrative example, each voice input of the plurality of voice inputs may include a first plurality of words, and each response of the plurality of responses may include a second plurality of words. The application may, for each respective voice input and for each respective response, receive one or more word transition metrics among words of both the first plurality of words and the second plurality of words. In some such embodiments, the application trains the model further based on the word transitions for the voice inputs and responses. In a further illustrative example, at least one respective voice input prosodic metric may be associated with one or more words of the voice input (e.g., a first plurality of words), and at least one respective response prosodic metric is associated with one or more words of the response (e.g., a second plurality of words). For example, the application may determine transition information based on the prosodic metrics of adjacent words, phrases, or sounds to improve naturalness of the response.

In a further illustrative example, the application may receive, determine, or both, a first emotion metric for each respective voice input and receive, determine, or both, a second emotion metric for each respective response (e.g., corresponding to the respective voice input). In some such embodiments, the application trains the model further based on each first emotion metric and each second emotion metric. For example, if a first set of voice inputs are associated with a first set of emotions, and a first set of responses are associated with a second set of emotion, the application may determine how the first set of emotions are correlated with the second set of emotions (e.g., based on the inputted features).

In a further illustrative example, the application may receive user profile information including user voice input history, user language, user characteristics, user location, user preferences, metadata tags associated with the user, any other suitable user profile information, or any combination thereof. In some such embodiments, the application trains the model further based on the user profile information. To illustrate, the features inputted to the model may include user age, location, accent, language, gender, any other suitable characterization that the model may accept as input, or any combination thereof.

In a further illustrative example, the application may receive interpolation metrics among transition of words of each voice input of the plurality of voice inputs, and train the model further based on each respective interpolation metric. In an embodiment, the application may determine a transition metric based on a difference in prosodic metrics between adjacent words or sounds, a difference in slope in prosodic metrics between adjacent words or sounds, a composite shape of a transition, any other suitable characteristic of a transition, or any combination thereof.

In a further illustrative example, the information used to generate the synthesized speech response includes prosodic characteristics, which may be used by a conversation system (e.g., conversation system 220 of FIG. 2) to generate the synthesized speech response.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   receiving a voice input by a voice assistant system;
   determining, based on the voice input, that the voice input is indicative of a user in a hurry;
   based on determining that the voice input is indicative of the user in the hurry:
   adjusting a default setting of the voice assistant system to increase a play speed setting for responses of the voice assistant system that is higher than a play speed for responses when the voice assistant system operates in accordance with a default setting; and
   generating a synthesized speech response that has a verbosity lesser than a verbosity of the voice assistant system when the voice assistant system operates in accordance with the default setting; and
   causing to be output the synthesized speech response that plays at the increased play speed that is higher than when the voice assistant system operates in accordance with the default setting, and that is less verbose than when the voice assistant system operates in accordance with the default setting.

2. The method of claim 1, comprising:
   predicting a set of audio features to be applied for each phrase and word of the synthesized speech response.

3. The method of claim 2, comprising:
   processing the predicted set of audio features using an interpolation operation to improve a prosodic characteristic and a prosodic transition in the synthesized speech response.

4. The method of claim 3, comprising:
   determining whether adjacent words and phrases of the predicted set of audio features have disparate, unmatched, and conflicting values; and
   in response to determining that the adjacent words and phrases of the predicted set of audio features have disparate, unmatched, and conflicting values, performing the interpolation operation affecting the transitions in the synthesized speech response.

5. The method of claim 1, wherein the determining based on the voice input that the voice input is indicative of the user in the hurry includes:
   accessing user profile information associated with a user, and comparing characteristics of the voice input to the user profile information.

6. The method of claim 1, wherein the generating the synthesized speech response includes:
   interpolation operations to affect transitions between words and sounds in the synthesized speech response to improve a prosodic characteristic of the synthesized speech response.

7. The method of claim 1, wherein the generating the synthesized speech response includes:
   interpolating, normalizing, and modifying a prosodic characteristic of the synthesized speech response to enhance prosody.

8. The method of claim 1, comprising:
   accessing interpolation metrics among word transitions from the voice input;
   accessing a model trained to determine a desired prosody based on the interpolation metrics; and
   based on the model, generating the desired prosody in the synthesized speech response.

9. A system comprising:
   a communications circuitry configured to:
   receive a voice input by a voice assistant system; and
   control circuitry configured to:
   determine, based on the voice input, that the voice input is indicative of a user in a hurry;
   based on determining that the voice input is indicative of the user in the hurry:
   adjust a default setting of the voice assistant system to increase a play speed setting for responses of the voice assistant system that is higher than a play speed for responses when the voice assistant system operates in accordance with a default setting; and
   generate a synthesized speech response that has a verbosity lesser than a verbosity of the voice assistant system when the voice assistant system operates in accordance with the default setting; and
   cause to be output the synthesized speech response that plays at the increased play speed that is higher than when the voice assistant system operates in accordance with the default setting, and that is less verbose than when the voice assistant system operates in accordance with the default setting.

10. The system of claim 9, wherein the control circuitry is configured to:
    predict a set of audio features to be applied for each phrase and word of the synthesized speech response.

11. The system of claim 10, wherein the control circuitry is configured to:
    process the predicted set of audio features using an interpolation operation to improve a prosodic characteristic and a prosodic transition in the synthesized speech response.

12. The system of claim 11, wherein the control circuitry is configured to:
    determine whether adjacent words and phrases of the predicted set of audio features have disparate, unmatched, and conflicting values; and
    in response to determining that the adjacent words and phrases of the predicted set of audio features have disparate, unmatched, and conflicting values, perform the interpolation operation affecting the transitions in the synthesized speech response.

13. The system of claim 9, wherein the control circuitry configured to determine based on the voice input that the voice input is indicative of the user in the hurry is configured to:
   access user profile information associated with a user, and comparing characteristics of the voice input to the user profile information.

14. The system of claim 9, wherein the control circuitry configured to generate the synthesized speech response is configured to:
   perform interpolation operations to affect transitions between words and sounds in the synthesized speech response to improve a prosodic characteristic of the synthesized speech response.

15. The system of claim 9, wherein the control circuitry configured to generate the synthesized speech response is configured to:
   interpolate, normalize, and modify a prosodic characteristic of the synthesized speech response to enhance prosody.

16. The system of claim 9, wherein the control circuitry is configured to:
   access interpolation metrics among word transitions from the voice input;
   access a model trained to determine a desired prosody based on the interpolation metrics; and
   based on the model, generate the desired prosody in the synthesized speech response.

\* \* \* \* \*